== United States Patent ==

[11] 3,612,962

[72] Inventor Yasuhiro Takeda
 Tokyo, Japan
[21] Appl. No. 66,011
[22] Filed Aug. 21, 1970
[45] Patented Oct. 12, 1971
[73] Assignee Alps Electric Co., Ltd.
 Tokyo, Japan
[32] Priority Sept. 4, 1969
[33] Japan
[31] 44/69679

[54] VARIABLE CONDENSER
 14 Claims, 7 Drawing Figs.
[52] U.S. Cl. .................................................. 317/254,
 334/83
[51] Int. Cl. ................................................... H01g 5/06
[50] Field of Search ......................................... 317/253,
 254; 334/83

[56] References Cited
UNITED STATES PATENTS
1,742,468 1/1930 Gilling .......................... 317/254

Primary Examiner—E. A. Goldberg
Attorney—James and Franklin

ABSTRACT: In a variable condenser, and particularly one of the rotary type, electrical connection between the rotor and an external point such as the ground frame is accomplished in a a contactless manner by means of capacitance defined between the rotor and a fixed part mounted on the frame, that fixed part and the rotor being separated from one another so as to define a gap therebetween. The said connecting capacitance is connected in series with the variable capacitance defined between the rotor and stator and is sufficiently large relative to that variable capacitance so as not appreciably to affect the overall capacitance of the unit. In its preferred form, the capacitance is defined between the rotor shaft and a cylindrical part which surrounds the rotor shaft, and the gap therebetween may be filled with a dielectric material which engages the shaft and serves as a bearing support therefor.

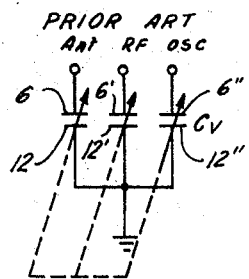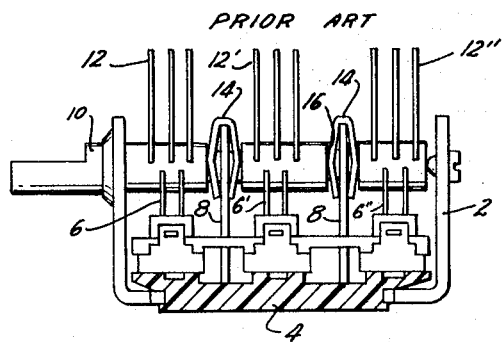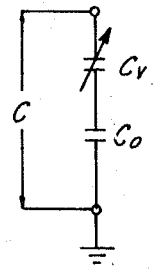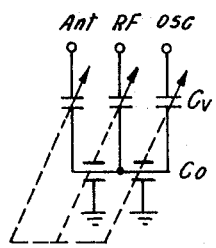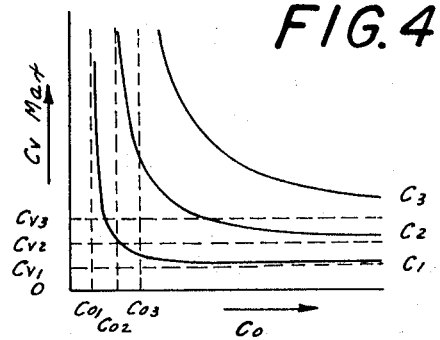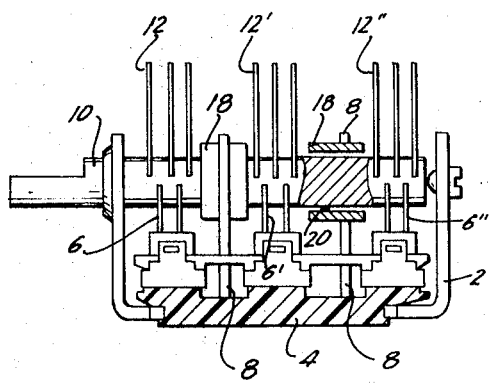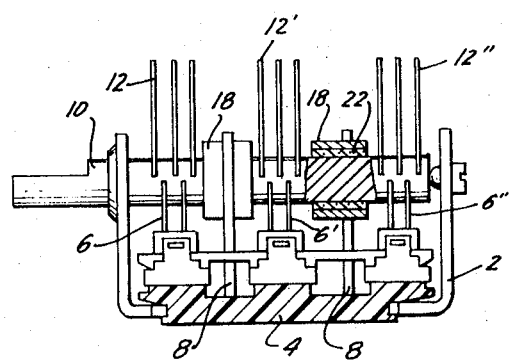
INVENTOR
YASUHIRO TAKEDA
ATTORNEY

VARIABLE CONDENSER

The present invention relates to the structure of a variable condenser, and particularly one of the rotary type, and provides improved means for making electrical connection to the rotor of that condenser.

Condensers of the type under discussion are quite widely employed for tuning purposes in AM, FM and TV receivers. In their most conventional form, which essentially dates back substantially to the beginning of the radio art, they comprise a stator having a plurality of stator plates and a rotor having a plurality of rotor plates secured to a rotatable shaft. As the shaft is rotated, the rotor and stator plates interleave and overlap to varying degrees, thereby altering the capacitance between them. In most installations, a plurality of circuits must be tuned together (e.g., an antenna circuit, a radiofrequency amplifier circuit and an oscillator circuit), and to that end the rotary variable condensers employed therewith are generally of ganged construction having a different set of stator and rotor plates for each of the circuits being tuned. Usually the rotor plates are connected to a common potential point, often constituted by the grounded frame or chassis of the condenser assembly, the individual stator plates of each set being insulatedly mounted on the frame and electrically connected to their appropriate external circuit in any suitable fashion.

When the rotor plates are all to be connected to a point of common potential, it is conventional to utilize a conductive shaft, the rotor plates not only being mounted thereon but also being electrically connected thereto. Means must be provided to electrically connect that shaft, and therefore the rotor plates of the various ganged sets, to the frame. This means usually comprises resilient conductive connecting elements compressed between the shaft and elements forming a part of the frame. This type of electrical connection is very widely used but is subject to serious disadvantages, particularly with regard to uniformity and reliability of connection. Since either the rotor or frame must move relative to the connecting element when the condenser is adjusted, wear inescapably occurs and hence the effective life of the assembly is necessarily limited. Even initially, and much more so as wear occurs, the degree of mechanical engagement between spring connecting element and rotor will vary as the rotor is turned and thus will cause undesired variation in the signal produced. The contact resistance is dependent upon the resiliency of the spring and the cleanliness of the surfaces which engage one another; the spring will lose its strength with time and wear, while rust and corrosion will adversely affect the electrical connection. The electrical connection is also highly sensitive to any shock to which the condenser may be subject.

It is a prime object of the present invention to provide a variable condenser in which electrical connection is made to the rotor in a manner which eliminates or minimizes the above disadvantages.

It is a further object of the present invention to devise a variable condenser characterized by long life and simple structure.

It is yet another object of the present invention to provide a variable condenser in which electrical connection is made to the rotor in a contactless fashion.

It is still a further object of the present invention to provide a variable condenser in which electrical connection is made to the rotor through a capacitance defined between the rotor and a part mounted on the frame and spaced from the rotor so as to define a gap therebetween, the capacitance between the rotor and said part having a magnitude such, in relation to the normal magnitude of the variable capacitance defined between the rotor and stator, as not materially to affect the latter magnitude.

To these ends I provide a variable condenser having a stator with a plurality of stator plates insulatedly mounted on a frame. A rotor shaft is rotatably mounted on that frame, and that shaft carries a plurality of rotor plates movable with the shaft into varying spatial relation to the stator plates, thereby to vary the capacitance defined between those plates. Electrical connection is made to the rotor plates by means of a capacitor plate or electrode secured to the frame and located in close proximity to the rotor, and preferably to the conductive rotor shaft, a gap being defined between that plate and the cooperating rotor part, thereby to define therebetween a capacitance of appropriate magnitude. The said condenser plate or electrode is electrically connected to an external point, and when the rotor is to be grounded is electrically connected to the grounded frame. The gap between the condenser electrode and the rotor shaft may contain a dielectric material which engages both the plate and the shaft, thereby to provide a supporting or bearing effect on the shaft. To the accomplishment of the above, and to such other objects as may hereinafter appear, the present invention relates to the construction of a variable condenser as defined in the appended claims and as described in this specification, taken together with the accompanying drawings, in which:

FIG. 1 is a schematic diagram of a three-gang variable condenser of the prior art;

FIG. 2 is a side elevational view, partially in cross section, of a typical three-gang rotary variable condenser of the prior art such as is schematically shown in FIG. 1;

FIG. 3 is a schematic diagram of the variable condenser of the present invention;

FIG. 4 is a graphic representation of the operative relationships between $C_v$ and $DC_o$ of the circuit of FIG. 3;

FIG. 5 is a schematic diagram of a three-gang variable condenser in accordance with the present invention;

FIG. 6 is a side elevational view, partially in cross section, of a three-gang variable condenser of the present invention; and FIG. 7 is a view similar to FIG. 6 but of another embodiment.

Referring to FIGS. 1 and 2, which respectively disclose schematically and physically a conventional arrangement for a three-gang variable condenser, the three-gang sections being adapted respectively to tune an antenna circuit, a radio frequency amplifier circuit and an oscillator circuit, the condenser comprises a U-shaped metallic frame 2 having an insert 4 of insulating material on which are mounted three sets of stator plates designated 6, 6' and 6''' respectively, each of the sets of stator plates being insulated from one another and each being adapted to be connected to their respective tuned circuits in any appropriate manner. The sets of stator plates are separated by conductive partitions 8 electrically connected to the frame 2. A conductive rotor shaft 10 is rotatably mounted in the frame 2 and passes through appropriately shaped openings formed in the partitions 8. The shaft 10 carries three sets of rotor plates 12, 12' and 12''' which move with the shaft 10 and are adapted to cooperate with and define a capacitance between themselves and the stator plates 6, 6' and 6''', respectively. The degree to which the rotor plates 12 interleave with and overlap the stator plates 6 determines the capacitance therebetween.

In accordance with the prior art, the rotor plates 12, 12' and 12'' are electrically connected to ground via the condenser frame 2 and the partitions 8. To accomplish this result in accordance with the prior art, conductive spring clips 14 are employed, those clips being compressed between the partitions 8 and shoulders 16 formed in the shaft 10 adjacent the points where they pass through the partitions 8.

As has been pointed out, the electrical connection between the rotor plates 12 and ground is, therefore, dependent upon the precise character of the engagement between the spring clips 14 and the shoulders 16 on the shaft 10. Any lack of uniformity in that contact engagement as the shaft 10 is rotated will generate electrical noise signals, and is undesirable. As the spring clips 14 lose their resiliency, and as the shoulder surfaces on the shaft 10 become rough, corroded, rusty or dirty, all as is virtually inevitable with the passing of time, the reliability and uniformity of the electrical connection of the rotor plates 12 to ground will be adversely affected. In addition, if the condenser is subjected to shock, the spring clips 14 will be affected thereby, again giving rise to the generation of undesirable noise signals.

FIG. 3 illustrates schematically the principle of the present invention. There $C_v$ represents the variable capacitance defined between the stator and rotor plates 6 and 12. C represents the effective capacitance of the condenser, and $C_o$ represents a capacitance in series with $C_v$ and connecting the latter to one side of the external circuit, such as ground. While $C_v$ is a variable capacitance, $C_o$ is a fixed capacitance.

In accordance with well-known circuit principles, the overall capacitance C of the series capacitance circuit of FIG. 3 is given by the following equation:

$$C = \frac{C_o C_v}{C_0 + C_v} = \frac{C_v}{1 + \frac{C_v}{C_o}}$$

As may be seen from the above relationship, if $C_o$ is sufficiently larger than $C_v$, C will be approximately equal to $C_v$, and as $C_v$ varies so will C vary, and to essentially the same degree. Therefore, if it is desired to connect into the external circuit a capacitance C' for tuning purposes, C may be made equal to C' by selecting a value $C_v$ which is only a little larger than C' and selecting $C_o$ to have a value sufficiently larger than $C_v$ so that C will be substantially equal to $C_v$. The cooperative relationship between different values of $C_o$ and $C_v$ for different desired values of C is shown in FIG. 4. From this it will be seen that if the variable capacitance $C_v$ is connected to ground by means of a capacitance $C_o$ which is much larger than $C_v$ (preferably at least several times as large) then the stator and rotor plates used to produce $C_v$ need not be appreciably greater than those required in the prior art embodiment of FIGS. 1 and 2, and that the presence of the connecting capacitance $C_o$ makes little change in the resulting capacitance C if the connecting capacitance $C_o$ is sufficiently large relative to the maximum value of the variable capacitance $C_v$.

In accordance therewith, in the present invention the rotor plates 12 are connected to ground (in the embodiment here disclosed to the grounded frame 2) by means of such a capacitor $C_0$, the electrical connection thus being accomplished in a contactless manner. This is schematically indicated in FIG. 5.

FIG. 6 is a representation of a preferred structural embodiment of the present invention. It is, in many respects, similar to the prior art structure shown in FIG. 2 and, where appropriate, similar reference numerals are applied to similar parts. The construction of FIG. 6 differs from the construction of FIG. 2 substantially solely with respect to the construction utilized where the shaft 10 passes through the partitions 8.

As shown in FIG. 6, the shaft 10 may be uniform in diameter (that alone constituting somewhat of a cost saving when compared to the prior art stepped shaft construction of FIG. 2), and the partition 8 carries a conductive part 18 located close to but spaced from the shaft 10, and here shown as cylindrical in shape through which the conductive shaft 10 passes with clearance 20, that clearance constituting an air gap between the shaft 10 and the part 18. Thus the part 18 constitutes a first condenser plate and the conductive shaft 10 constitutes a second condenser plate, the capacitance therebetween constituting the capacitor $C_o$ of FIGS. 3 and 5. The part 18 is mounted on the partition 8 in such a manner as to be electrically as well as physically connected thereto, and hence the rotor plates 12 are connected to ground via the rotor shaft 10 and the cylindrical part 18, the partition 8 and the frame 2. The magnitude of $C_o$ necessary appropriately to cooperate with the maximum magnitude of the variable capacitance $C_v$ provided between the stator and rotor plates 6 and 12 in accordance with the principles set forth above is easily achieved through suitable design of the axial length of the part 18 and the radial size of the air gap 20.

In the embodiment of FIG. 6 the gap 20 between the cylindrical part 18 and the shaft 10 is filled with air. In the alternative embodiment illustrated in FIG. 7 that gap is radially filled over at least a portion of its axial extent with a body 22 of solid or semisolid dielectric material. The dielectric body 22 is supported by the cylindrical part 18 and engages the shaft 10 and therefore supports and provides a bearing surface for the shaft, rigidifying the entire structure and making it even more resilient to shock than the embodiment of FIG. 6.

It is noteworthy that such variation in $C_o$ as may occur because of lack of concentricity of the shaft 10 relative to the surrounding part 18, or any shocks to which the condenser may be subjected, will have no appreciable effect on the value of C, since that value is determined primarily by the magnitude of $C_v$. Moreover, corrosion or rusting of the opposing surfaces of the shaft 10 and the part 18 will have no significant effect on the value of $C_0$. Hence, the electrical connection of the rotor plates 12 to ground will be effected reliably and without having to employ precision parts, the connection will be essentially noiseless from an electrical point of view, and its life will be relatively unlimited.

While a limited number of embodiments of the present invention have been here specifically disclosed, it will be apparent that many variations may be made therein, all without departing from the spirit of the invention as defined in the following claims.

I claim:

1. A variable condenser comprising a frame, stator means insulatedly mounted on said frame, rotor means comprising a shaft rotatably mounted on said frame and first plate means on and movable with said shaft and cooperating with said stator means to define a capacitance therebetween variable within a given range of magnitudes for different operative positions of said plate means relative to said stator means, and means for making external electrical connection to said rotor means comprising second plate means electrically connected to an external point, mounted on said frame so as to be adjacent to but out of engagement with said rotor means, thereby to define an airgap therebetween, and effective to define a capacitance between itself and said rotor means for all operative positions of said plate means which is sufficiently larger than the maximum value of said variable capacitance between said rotor means and stator means so that the magnitude of the total series capacitance between said external point and said stator means is essentially that of said variable capacitance.

2. The condenser of claim 1, in which said shaft is conductive, said first plate means is electrically connected thereto, and said second plate means comprises a conductive part mounted on said frame adjacent and spaced from said shaft.

3. The condenser of claim 2, in which said conductive part is electrically connected to said frame.

4. The condenser of claim 3, in which dielectric material is located in said airgap.

5. The condenser of claim 2, in which dielectric material is located in said airgap.

6. The condenser of claim 2, in which said conductive part at least partially surrounds said shaft.

7. The condenser of claim 6, in which dielectric material is located in said airgap and engages said shaft and said part, thereby to function as a bearing means for said shaft.

8. The condenser of claim 3, in which said conductive part at least partially surrounds said shaft.

9. The condenser of claim 8, in which dielectric material is located in said airgap and engages said shaft and said part, thereby to function as a bearing means for said shaft.

10. The condenser of claim 2, in which said conductive part is substantially cylindrical and substantially surrounds said shaft.

11. The condenser of claim 10, in which dielectric material is located in said airgap and engages said shaft and said part, thereby to function as a bearing means for said shaft.

12. The condenser of claim 3, in which said conductive part is substantially cylindrical and substantially surrounds said shaft.

13. The condenser of claim 12, in which dielectric material is located in said airgap and engages said shaft and said part, thereby to function as a bearing means for said shaft.

14. The condenser of claim 1, in which said external point is said frame.